(12) United States Patent
Hudson et al.

(10) Patent No.: US 10,885,367 B2
(45) Date of Patent: Jan. 5, 2021

(54) DEVICE, METHOD AND SYSTEM FOR DETECTING PARKING IN A NO PARKING AREA

(71) Applicant: Municipal Parking Services, Inc., Minnetonka, MN (US)

(72) Inventors: Thomas G. Hudson, Tonka Bay, MN (US); Joseph M. Caldwell, Chanhassen, MN (US); Mark J. Moran, Woodbury, MN (US); James Conlan, Minneapolis, MN (US); John J. Leier, Brooklyn Park, MN (US); Richard W. Kelley, II, Corcoran, MN (US); Marcus N. Schmidt, Minnetonka, MN (US)

(73) Assignee: Municipal Parking Services, Inc., Minnetonka, MN (US)

( * ) Notice: Subject to any disclaimer, the term of this patent is extended or adjusted under 35 U.S.C. 154(b) by 39 days.

(21) Appl. No.: 16/172,577

(22) Filed: Oct. 26, 2018

(65) Prior Publication Data

US 2019/0130203 A1 May 2, 2019

Related U.S. Application Data

(60) Provisional application No. 62/577,699, filed on Oct. 26, 2017.

(51) Int. Cl.
*G06K 9/00* (2006.01)
*G06K 9/32* (2006.01)
(Continued)

(52) U.S. Cl.
CPC ............ *G06K 9/3241* (2013.01); *E01F 9/617* (2016.02); *E01F 13/026* (2013.01);
(Continued)

(58) Field of Classification Search
CPC .... E01F 13/026; E01F 9/617; G06K 9/00624; G06K 9/00771; G06K 9/3241; G06T 2207/30264; G06T 7/13; G06T 7/70
See application file for complete search history.

(56) References Cited

U.S. PATENT DOCUMENTS

| 4,827,206 A | 5/1989 | Speas |
| 8,487,754 B2 | 7/2013 | Mitschele |
| (Continued) | | |

OTHER PUBLICATIONS

The International Search Report rendered by the International Searching Authority for PCT/US18/57847, dated Mar. 13, 2019, 10 pages.

*Primary Examiner* — Ian L Lemieux
(74) *Attorney, Agent, or Firm* — Skaar Ulbrich Macari, P.A.

(57) ABSTRACT

A parking enforcement device can be secured to a surface adjacent to the area designated as NO PARKING. The enforcement device can include a camera aimed towards the area designated as NO PARKING and monitor this area for the entry of a vehicle. A parking violation is determined to have occurred upon determining that the vehicle has entered the area designated as NO PARKING, and image data of the entry of a vehicle into the NO PARKING area that was captured by the camera can be relayed to a remote computing system. The parking enforcement device can be provided as a bollard that includes a camera secured to a center pole extending vertically upwards inside of the bollard. The camera can be located along the center pole so that the camera views outward from the bollard via a window section of the bollard.

20 Claims, 3 Drawing Sheets

(51) Int. Cl.
*G06T 7/13* (2017.01)
*G06T 7/70* (2017.01)
*E01F 13/02* (2006.01)
*E01F 9/615* (2016.01)

(52) U.S. Cl.
CPC ..... *G06K 9/00624* (2013.01); *G06K 9/00771* (2013.01); *G06T 7/13* (2017.01); *G06T 7/70* (2017.01); *G06T 2207/30264* (2013.01)

(56) References Cited

U.S. PATENT DOCUMENTS

| | | |
|---|---|---|
| 10,373,226 B1* | 8/2019 | Russell .............. G06Q 30/0613 |
| 2012/0285791 A1 | 11/2012 | Jones et al. |
| 2013/0107041 A1* | 5/2013 | Norem .............. G06K 9/00832 348/143 |
| 2014/0207541 A1 | 7/2014 | Nerayoff et al. |
| 2014/0210646 A1* | 7/2014 | Subramanya ........... B61L 29/28 340/928 |
| 2014/0257943 A1* | 9/2014 | Nerayoff ................. G06T 7/292 705/13 |
| 2014/0339374 A1* | 11/2014 | Mian ....................... G08G 1/04 246/473.1 |
| 2015/0009047 A1* | 1/2015 | Ashkenazi ............. G08G 1/144 340/932.2 |
| 2015/0085129 A1* | 3/2015 | Mihalyov .............. G07B 15/02 348/150 |
| 2016/0125246 A1* | 5/2016 | Ryhorchuk ........ H04N 5/23206 348/143 |
| 2017/0116857 A1* | 4/2017 | Moran ................... G08G 1/142 |
| 2018/0240337 A1* | 8/2018 | Moran ................... G08G 1/147 |
| 2019/0306408 A1* | 10/2019 | Hofer ..................... H04N 5/247 |
| 2020/0193722 A1* | 6/2020 | Moran ................... G07B 15/02 |

* cited by examiner

DEVICE, METHOD AND SYSTEM FOR DETECTING PARKING IN A NO PARKING AREA

PRIORITY

This application claims the priority benefit of U.S. Provisional Application No. 62/577,699, filed on Oct. 26, 2017, which is hereby incorporated herein by reference in its entirety.

FIELD

The present invention relates generally to parking enforcement systems and, more particularly, to methods, systems and devices for automatically detecting the presence of a vehicle in a location where parking is prohibited.

BACKGROUND

There are many locations where it is undesirable for vehicles to park. For example a vehicle is a safety hazard if parked in a fire lane, in a bike lane or too near a fire hydrant. Unfortunately, clearly marking such "no parking" areas does not deter some people from parking there anyway. Thus, it is necessary to issue parking violation notices (e.g., parking tickets) to persons that park where prohibited. Such violations typically require a fine to be paid. However escalating penalties can be levied.

In order to issue a parking violation notice, citation or ticket to an illegally parked vehicle, a person authorized to issue parking citations (e.g. police officer or parking enforcement officer) must issue the notice to the vehicle when it is in the illegal parking location. A given officer cannot monitor everywhere at once and illegal parking is often short term in nature. Thus, many violations are not cited. Adding more enforcement officers cannot realistically capture all illegal parking acts. And adding more officers adds significant costs to the enforcement process.

Thus, there is a need to make the citation process automated for prohibited parking areas so that fewer violations go uncited and without increasing enforcement costs by adding more enforcement officers.

SUMMARY

Disclosed are devices, systems and methods for monitoring and managing enforcement of prohibited or "no parking" areas. In one aspect, a "no parking" enforcement device can include an embedded processor and microcontroller used to operate timers, decorative and targeted lights, cameras, and vehicle detection sensing (magnetometer, radar, etc. . . . ) means. The enforcement device is connected to the internet through either hard-wiring, Wi-Fi, a cellular modem or other wireless means. Power is supplied via hard-wiring, battery, and/or solar panels.

The enforcement device can be configured in the form of a bollard and monitor a single or multiple areas that have been designated by a governmental authority as "No Parking" areas. The enforcement device can be mounted adjacent the area(s) where a "no parking" condition is desired to be enforced. A variety of vehicle detection means can be employed to detect a vehicle in the "no parking" location. A violation notice and pertinent vehicle data and images are relayed to a remote computer system or to the municipality for processing and issuance of a parking citation to the vehicle's owner.

The parking enforcement device can be secured to a surface adjacent to the area designated as NO PARKING or to any other structure or can be incorporated into other traffic control devices or items of infrastructure (e.g. light poles).

The enforcement device can include a camera aimed towards the area designated as NO PARKING and monitor this area for the entry of a vehicle. A parking violation is determined to have occurred upon determining that the vehicle has entered the area designated as NO PARKING, and image data of the entry of a vehicle into the NO PARKING area that was captured by the camera can be relayed to a remote computing system.

The parking enforcement device can be provided as a bollard that includes a camera secured to a center pole extending vertically upwards inside of the bollard. The camera can be located along the center pole so that the camera views outward from the bollard via a window section of the bollard.

The parking enforcement device can include an elongated tubular body with a window section disposed atop the tubular body. A center pole can extend vertically through the tubular body and the window section. A camera can be secured to the center pole and located such that the camera views outward through the window section. An electrical control board can also be disposed inside of the tubular body.

A top plate can be disposed atop the window section and the tubular body can be disposed atop the base. A top cap can be disposed atop the top plate and/or atop the window section. Solar cells can be disposed on an exterior surface of the top cap. A horizontal plate can be disposed over the center pole and located within either the window section or the tubular body. A light can be disposed adjacent to the horizontal plate and arranged to project light outwardly from the parking enforcement device.

The control board can include a processor that is configured to monitor an area designated as NO PARKING for the presence of a vehicle in the area designated as NO PARKING. The processor can utilize the camera to perform a machine vision analysis of the area designated as NO PARKING for the presence of vehicles in the area designated as NO PARKING. The processor can utilize the camera to capture an image of a license plate of the vehicle in the area designated as NO PARKING. The processor can transmit an image of the vehicle in the area designated as NO PARKING to a remote computing system. The processor can be configured to determine that a parking violation has occurred upon determining that the vehicle is present in the area designated as NO PARKING. The processor can also initiate a request for towing services upon an expiration of a predetermined period of time following a determination that the vehicle is present in the area designated as NO PARKING without the vehicle having left the area designated as NO PARKING.

A method of monitoring an area designated as NO PARKING can include securing a bollard to a surface adjacent to the area designated as NO PARKING, monitoring the area designated as NO PARKING for the entry of a vehicle into the area designated as NO PARKING, determining that a parking violation has occurred upon determining that the vehicle has entered the area designated as NO PARKING, and relaying image data of the entry of a vehicle into the area designated as NO PARKING, as captured by a camera, to a remote computing system. The camera is located inside of the bollard and aimed towards the area designated as NO PARKING.

The step of monitoring the area designated as NO PARKING for the entry of a vehicle into the area designated as NO PARKING includes using image data from the camera to perform a machine vision analysis to detect the presence of the vehicle in the area designated as NO PARKING. The step of monitoring the area designated as NO PARKING for the entry of a vehicle into the area designated as NO PARKING can further include using radar to sense the presence of the vehicle in the area designated as NO PARKING.

Towing services can be requested by the bollard upon an expiration of a predetermined period of time following the determination that the vehicle is present in the area designated as NO PARKING without the vehicle having left the area designated as NO PARKING.

The determination that a parking violation has occurred can be made without first timing a grace period.

A violation indicator light can be illuminated upon determining that a parking violation has occurred.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 3 is a perspective view of a center assembly for the parking enforcement device of FIG. 1 in accordance with certain example embodiments of the invention.

FIG. 4 is a perspective view of an outer enclosure assembly for the parking enforcement device of FIG. 1 in accordance with certain example embodiments of the invention.

FIG. 5 is an exploded perspective view of an upper portion of the center assembly of the parking enforcement device of FIG. 1 in accordance with certain example embodiments of the invention.

FIG. 6 is an exploded perspective view of a camera portion of the center assembly of the parking enforcement device of FIG. 1 in accordance with certain example embodiments of the invention.

FIG. 7 is an exploded perspective view of a middle portion of the center assembly of the parking enforcement device of FIG. 1 in accordance with certain example embodiments of the invention.

FIG. 9 is a perspective view of a lower portion of the center assembly of the parking enforcement device of FIG. 1 in accordance with certain example embodiments of the invention.

FIG. 12 is a perspective view of a center assembly for the parking enforcement device of FIG. 10 in accordance with certain example embodiments of the invention.

FIG. 13 is another perspective view of a center assembly for the parking enforcement device of FIG. 10 in accordance with certain example embodiments of the invention.

FIG. 14 is a perspective view of an outer enclosure assembly for the parking enforcement device of FIG. 10 in accordance with certain example embodiments of the invention.

FIG. 15 is an exploded perspective view of an upper portion of the center assembly of the parking enforcement device of FIG. 10 in accordance with certain example embodiments of the invention.

FIG. 16 is an exploded perspective view of a camera portion of the center assembly of the parking enforcement device of FIG. 10 in accordance with certain example embodiments of the invention.

FIG. 17 is an exploded perspective view of a lower portion of the center assembly of the parking enforcement device of FIG. 10 in accordance with certain example embodiments of the invention.

FIG. 18 is another exploded perspective view of a lower portion of the center assembly of the parking enforcement device of FIG. 10 in accordance with certain example embodiments of the invention.

FIG. 19 is an illustration of a vehicle illegally parked next to a fire hydrant in a location being monitored by a parking enforcement device in accordance with certain example embodiments of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Any dimensional information provided herein and indicated in the figures is for certain preferred embodiments. It should be recognized, however, that the dimensions, proportions, scale and configurations of components are merely example embodiments and can be varied unless specifically limited in a given claim. Thus, the dimensions, proportions, scale and configurations can be varied without departing from the scope of the invention except where explicitly limited by a given claim.

Referring to FIGS. 1-9, the depicted "no parking" enforcement device 100 is configured in the form of a bollard. The bollard can also be configured to monitor parking events in locations where parking is allowed. In the latter situation, the bollard 100 is networked with a kiosk and a nearby parking meter that includes a user interface and payment acceptor means, such as that disclosed in U.S. Pat. No. 9,773,351, which is fully incorporated herein by reference.

Figure 1:
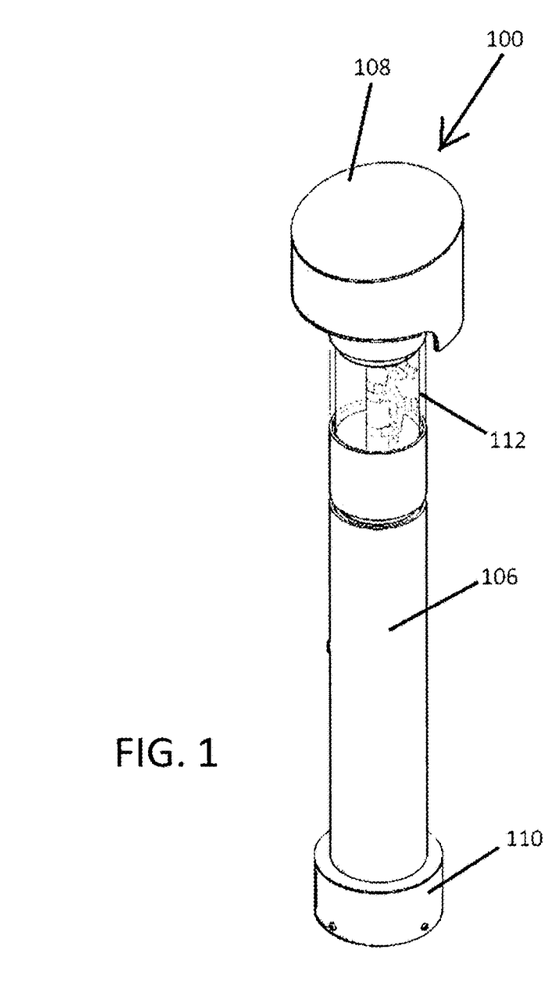
FIG. 1 is a perspective view of a parking enforcement device in accordance with certain example embodiments of the invention.

The enforcement bollard 100 generally comprises a center assembly 102 (FIG. 3) and an outer enclosure 104 (FIG. 4) disposed over the center assembly 102. The fully assembled bollard 100 is shown in FIG. 1. A cylindrical body 106 extends upward from a base 110. A transparent (or semi-transparent) window 112 is disposed atop the cylindrical body 106 so that the camera or cameras inside of the cylindrical body 106 can see through to the location being monitored for illegal parking. The outline of the cameras can be seen in FIG. 1 through the window 112. A cap 108 is disposed atop the window portion 112.

The cylindrical body 106 can also have other elongated tubular shapes besides circular, such as square, triangular, octagonal or polygonal or other cross-sectional shape.

The cylindrical body 106, base 110 and top cap 108 can be formed of metal. The window can be formed of plastic.

Figure 2:
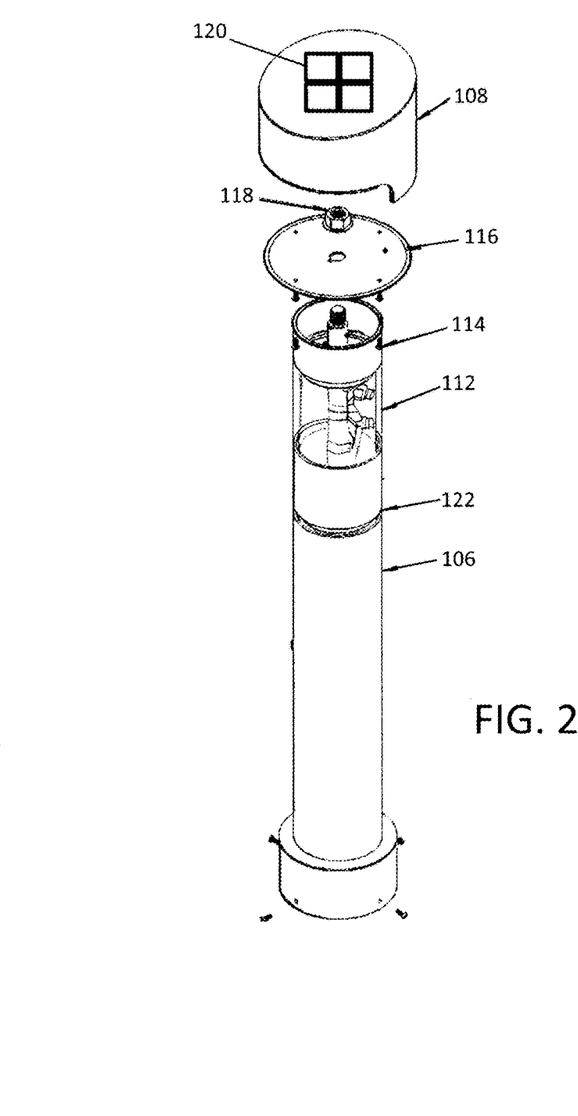
FIG. 2 is a partial exploded perspective view of the parking enforcement device of FIG. 1 in accordance with certain example embodiments of the invention.

FIG. 2 shows the components of the top assembly of the bollard 100. A cylindrical collar 114 is disposed atop the window 112. A top plate 116 is disposed atop the collar 114. There is a hole in the center of the plate 116 so that a portion of the center post (discussed below) can protrude upwards and receive a nut 118 that secures the plate 116 and collar 114 in place. Note that rubber gaskets can be disposed between components to further enhance the weather-proof performance of the bollard. The top cap 108 is disposed atop the top plate to hide the nut 118 and present an attractive finished appearance to the bollard 100.

The top surface of the top cap 108 can be rounded, flat or other desired shape. A grid of solar cells 120 can be disposed on the upper surface of the top cap 108.

The bollard 100 can also be provided with a secondary window located below the primary window 112 to function as a violation light window 122. In embodiments that include this feature, the violation light window 122 allows an internal light to project outward to form a lighted ring that provides a status indicator to persons that are parking or would attempt to park in a space being monitored.

If the bollard were being used as a parking space monitor device, then the ring could be green to indicate that the space is available for parking or that the space is paid for and will not imminently expire. A yellow ring may indicate that time is about to expire or that a grace period is currently counting down. A red ring can indicate that a violation has occurred.

If the bollard is configured to monitor a no parking location, the violation light window may be omitted or not used or may be lighted red at all times. The light can be flashed to further call attention to the no parking status if a vehicle attempts to enter the no parking area being monitored.

FIG. 3 shows the center assembly 102 with the outer enclosure 104 components removed. A center pole 124 extends through the vertical height of the cylindrical body 106. The lower end is fastened to the base and the top end is fastened to the top plate 116. The cameras and electric components of the device are secured to the pole 124 as will be described below with regard to FIGS. 5-9. The center pole 124 can be formed of metal, fiberglass, carbon fiber, plastic or other suitable rigid material.

FIG. 4 shows an exploded view of the components comprising the outer enclosure 104 of the bollard 100. The cylindrical body 106 is divided into an upper portion 106a and lower portion 106b, which are divided by the violation light window 122. Of course, the cylindrical body can be a single piece or can be divided into more then two segments in alternative embodiments. Rubber gasket rings 126 are provided between each of the adjacent components to seal the enclosure against water and environmental contaminants.

FIG. 5 illustrates details of the upper internal assembly that is disposed above the cameras. A pair of upper horizontal plates 128, 130 are disposed over the pole 124 and located above the cameras 132. These plates block light from reaching the cameras. Clamps or other fasteners can be used to secure the plates to the pole 124.

Also, a light (e.g., one or more LED strips) 134 is disposed between the upper horizontal plates 128, 130 to provide an attractive look, to add safety so that the bollard is not impacted, to provide safety illumination for nearby persons, and to signal to persons parking vehicles that they are parking illegally. In the latter circumstance, the light color can be changed to a warning color such as yellow or red, vs. a normal white or other color. Light intensity and color can also be varied to match ambient conditions. A light sensor can be included for providing ambient light input data. The LED light strip(s) can be fastened to a mounting bracket 136 such as that shown in FIG. 5.

FIG. 6 illustrates details of the camera assembly. One or more cameras 132 are secured to the center pipe 124 and view outward through the window 112. One camera is shown in FIG. 6, but two or more cameras can be provided to increase the area(s) being monitored by a particular bollard 100. The cameras 132 are secured to the pole by a bracket 138 and fastener hardware.

FIG. 7 illustrates details of the lower internal assembly that is disposed below the cameras 132. A pair of lower horizontal plates 140, 142 are disposed over the pole 124 and located below the cameras 132. These plates also block light from reaching the cameras. Clamps or other fasteners can be used to secure the plates to the pole 124. Another of the previously-mentioned lights 134 can be provided between the plates.

Figure 8:
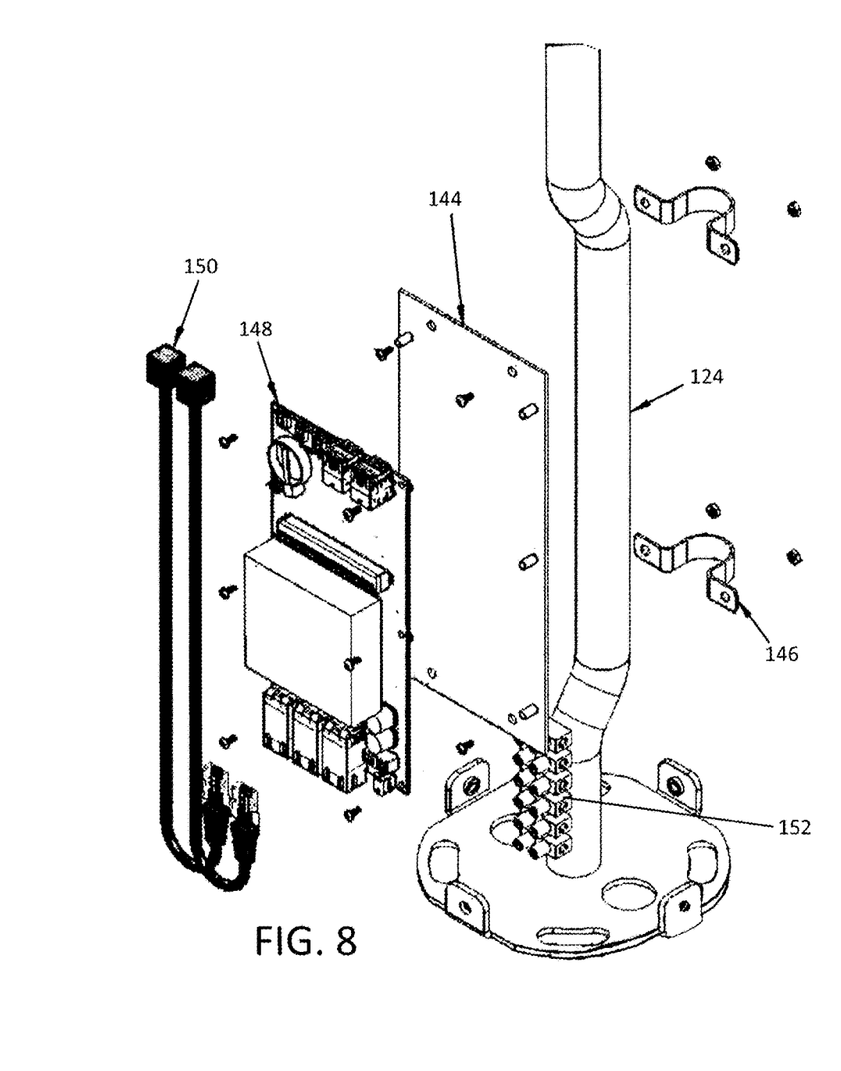
FIG. 8 is an exploded perspective view of a lower portion of the center assembly of the parking enforcement device of FIG. 1 in accordance with certain example embodiments of the invention.

FIGS. 8-9 illustrate details of the electrical control components for the bollard. A flat mounting plate 144 is secured to a lower portion of the center pole 124 with clamps 146 and fasteners to provide a support surface for mounting the PCB (printed circuit board) control board 148 and other electrical circuit components. Those circuit components include the physical processor, controller and memory components that control operation of the bollard 100. Cables 150 connect each of the cameras to respective terminals on control board 148.

The control board can also include the wireless communication componentry, such as Bluetooth, Wi-Fi, cellular modem or other wireless communications means.

A terminal connection block 152 is also secured to the pole 124 and located adjacent to the control board 148. The connection block 152 provides a plurality of connection points for conduits connecting various electrical components, such as the lights, with the control electronics disposed on the board 148.

A computer readable program code (e.g., software code) can be stored in the physical memory (e.g., random access memory, flash memory or hard-drive) of the device. The computer readable program code is configured such that when executed by the controller or processor, the code causes the device to perform the steps of the invention described herein.

A plurality of flanges 154 extend upward from a bottom plate 156 so that the base 110 can be secured in place. The bottom plate 156 also includes a plurality of apertures 158 through which fasteners can be inserted so that the bollard 100 can be secured to the ground.

Another embodiment of the parking enforcement bollard is shown in FIGS. 10-18 and is generally designated with the numeral 200. The bollard 200 again generally comprises a center assembly 202 (FIGS. 12-13) and an outer enclosure 204 (FIG. 5) disposed over the center assembly 202.

Figure 10:
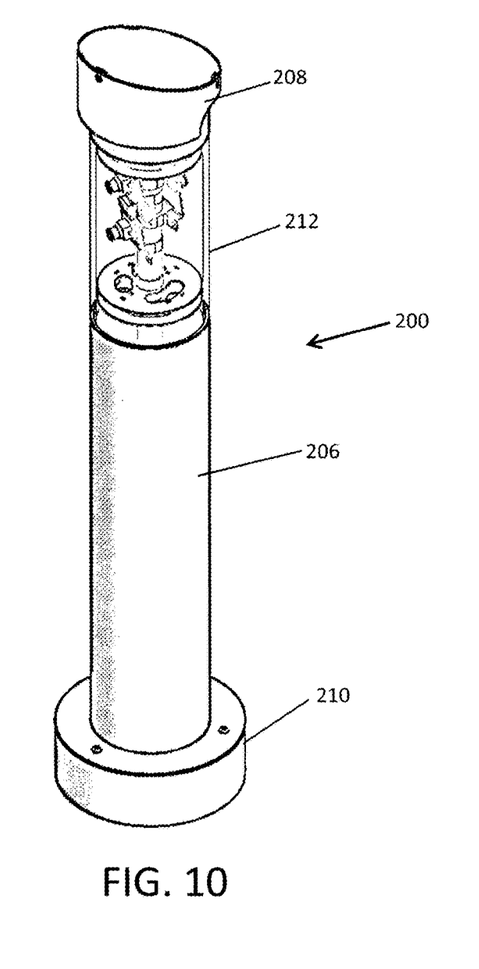
FIG. 10 is a perspective view of a parking enforcement device in accordance with certain example embodiments of the invention.

The fully assembled bollard 200 is shown in FIG. 10. An elongated tubular body 206 sits atop a base 210. A transparent (or semi-transparent) window 212 is disposed atop the tubular body 206 so that the camera or cameras inside of the tubular body 206 can see through to the location being monitored for illegal parking. The outline of the cameras can be seen in FIG. 10 through the window 212. A cap assembly 208 is disposed atop the window portion 212.

Figure 11:
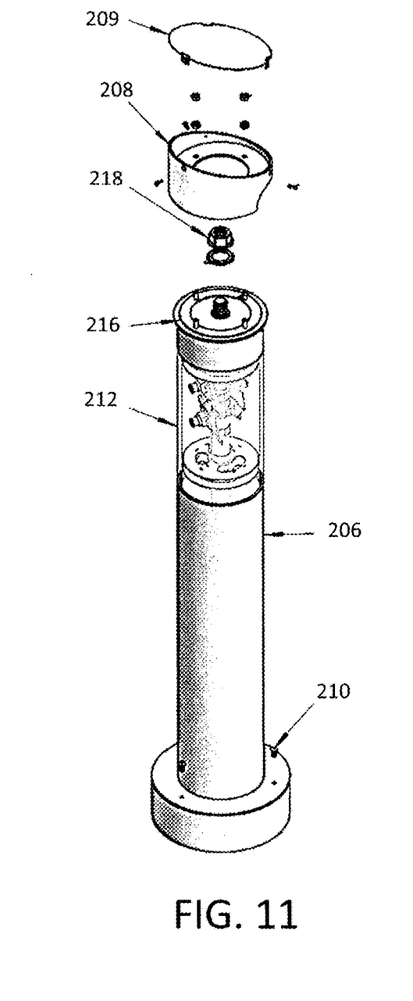
FIG. 11 is a partial exploded perspective view of the parking enforcement device of FIG. 10 in accordance with certain example embodiments of the invention.

FIG. 11 shows the components of the top assembly of the bollard 200. A cylindrical collar 214 portion of the top plate 216 is disposed atop the window 212. There is a hole in the center of the top plate 216 so that a portion of the center post (discussed below) can protrude upwards and receive a nut 218 that secures the collar/plate 216 in place. Rubber gaskets can be disposed between components to further enhance the weather-proof performance of the bollard. The top cap assembly 208 is disposed atop the top plate 216 to hide the nut 218 and present an attractive finished appearance to the bollard 100.

The top cap assembly 208 in this embodiment has a removable upper plate 209. The upper plate 209 can be removed to gain access to the nut 218 without the need to first remove the remaining portion of the cap assembly 208.

The top surface of the top cap 208 can be rounded, flat or other desired shape. A grid of solar cells can be disposed on the upper surface of the top cap 208 similar to that shown in FIG. 2.

The bollard 200 does not have a secondary window located below the primary window in this embodiment. However, such a feature can be added.

FIGS. 12-13 show the center assembly 202 with the outer enclosure 204 components removed. A center pole 224 extends through the vertical height of the cylindrical body. The lower end is fastened to the base and the top end is fastened to the top plate 216. The camera(s) and electric components of the device are secured to the pole 224 as will be described below with regard to FIGS. 15-18.

FIG. 14 shows an exploded view of the components comprising the outer enclosure 204 of the bollard 200. The tubular body 206 sits atop the base portion 210 and the window portion 212 is disposed atop the tubular body 206. The tubular body 206 is a single piece in this embodiment. However, the tubular body 206 can be formed of two or more segments in alternative embodiments. Rubber gasket rings 226 are provided between each of the adjacent components to seal the enclosure against water and environmental contaminants.

FIG. 15 illustrates details of the upper internal assembly that is disposed above the camera(s). A pair of upper horizontal plates 228, 230 are disposed over the pole 224 and located above the camera 232. These plates block light from reaching the cameras and keep the pole 224 centered within the bollard. Clamps or other fasteners can be used to secure the plates to the pole 224. No lights are provided in this embodiment, but could be included, if desired, as described in the previous embodiment.

FIG. 16 illustrates details of the camera assembly. A camera 232 is secured to the center pipe 224 and arranged to view outward through the window 212. One camera is shown in FIG. 16, but two or more cameras can be provided to increase the area(s) being monitored by the particular bollard 200. The cameras 132 are secured to the pole by a bracket 238 and fastener hardware.

FIG. 16 also illustrates the lower internal assembly that is disposed below the cameras 232. A pair of lower horizontal plates 240, 242 are disposed over the pole 224 and located below the camera 232. These plates also block light from reaching the camera and center the pole 224. Clamps or other fasteners are used to secure the plates to the pole 224. Again, no lights are provided in this embodiment, but could be included, if desired, as described in the previous embodiment.

FIGS. 17-18 illustrate details of the electrical control components for the bollard 200. A flat mounting plate 244 is secured to a lower portion of the center pole 224 with clamps 246 and fasteners to provide a support surface for mounting the control board 148 and other electrical circuit components. Those circuit components include the physical processor, controller and memory components that control operation of the bollard 200. The control board can also include the wireless communication componentry, such as Bluetooth, Wi-Fi, cellular modem or other wireless communications means. A terminal connection block 252 is also secured to the pole 224 and located along the pole 224 opposite the mounting plate 244. Cables are not shown, but conduits would be provided to connect each of the cameras and other components to their respective terminals on control board 248.

Any of the foregoing embodiments can also include an impact sensor located within the bollard and coupled to the processor. The impact sensor senses impacts above a threshold force value such as might be encountered by vandalism or a vehicle strike. If such an impact is sensed, the processor transmits a communication of the impact event to a central control computer for further investigation and possible repairs.

Onboard batteries can be located within the housing 104, 204 and secured to the inner pole 124, 224 to power the onboard electronics.

Use of the bollard will now be described with reference to FIG. 19. The bollard will now be designated with reference number 300. It should be understood that any of the foregoing embodiments and variations of the bollard may be used as described herein. The bollard 300 is disposed adjacent to a designated NO PARKING area 302. The bollard 300 is placed and the camera in the bollard 300 is aimed so that the license plate of the vehicle is captured by the camera.

In the example shown in FIG. 19, parking in area 302 is prohibited because the space is adjacent to a fire hydrant 304. The parking space is preferably marked by appropriate conventional designations to warn potential parkers of the NO PARKING status. A vehicle 306 is shown as having entered the monitored space 302. The vehicle's presence is sensed (detected) by the bollard 300 upon entry into the monitored space 302.

Vehicle detection can be performed solely by machine vision algorithms, such as background subtraction, edge detection, pattern recognition, or a combination thereof. Other sensors, such as magnetometer, radar, and sonar sensors can be included within the enclosure of the device. A further window can be provided, if necessary, for the non-image sensors. One or more of the sensors can be located remote from the enclosure in a further alternative embodiment. Machine vision can be combined with one or more of the other detection means to operate as a double-check to confirm that the vehicle has been detected in the NO PARKING space. Vehicle detection methods suitable for the present device are disclosed in U.S. Pat. Pub. Nos. 2017/0116857 A1 and 2018/0240337 A1, which are both incorporated herein by reference in their entirety.

Once a vehicle is detected as having parked in the NO PARKING space, a violation is deemed to have occurred. Alternatively, a grace period can be timed upon such detection, and no violation will be deemed to have occurred if the vehicle exits the NO PARKING space before the grace period expires.

At (or before or after) the time of violation, image (video or still image data) and any calculated information are relayed to the back office (e.g. central computer, cloud computer or other remote computing system) computing system for issuance of the parking violation, or relay to the municipality for issuance of the violation notice. This same information may also or alternatively be relayed to parking enforcement officers using handheld mobile applications such as disclosed in U.S. Pat. Pub. No. 2017/0032582 A1, which is incorporated herein by reference in its entirety.

The bollard is configured via its software code to maintain the logical state of the areas being monitored to record and can report violations to the municipality through use of a hosted back office application and/or handheld mobile applications in real time. In cases where internet connectivity is temporarily unavailable, images and calculated information are stored locally in the memory until the connection is restored.

The bollard can also time the length of the violation and take additional action as appropriate, including notifying the back office computing system when certain milestones occur, such as 10 minutes, 20 minutes, etc., and/or the bollard can also send notification to a towing service to tow the illegally-parked vehicle.

As a vehicle in the monitored NO PARKING area exits the monitored area, any timers applicable to the event are reset awaiting the next vehicle detection event.

Depending on the environment surrounding the enforcement bollard, lights may be illuminated to indicate no parking status or violation occurrence. Targeted lights or a flash can be used to improve camera vision on the area where an image is captured by the camera.

Emergency and official vehicles can be exempted from violation issuance through use of license plate recognition and image review by the municipality officers or via automated algorithms.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A parking enforcement device, comprising:
    an elongated tubular body;
    a window section disposed atop the tubular body;
    a center pole extending vertically through the tubular body and the window section;
    a camera secured to the center pole and located such that the camera views outward through the window section; and
    an electrical control board disposed inside of the tubular body.

2. The parking enforcement device of claim 1, further comprising:
    a top plate disposed atop the window section; and
    a base,
    wherein the tubular body is disposed atop the base.

3. The parking enforcement device of claim 2, further comprising a top cap disposed atop the top plate.

4. The parking enforcement device of claim 1, further comprising a top cap disposed atop the window section.

5. The parking enforcement device of claim 4, further comprising a plurality of solar cells disposed on an exterior surface of the top cap.

6. The parking enforcement device of claim 1, further comprising a horizontal plate disposed over the center pole and located within either the window section or the tubular body.

7. The parking enforcement device of claim 6, further comprising a light disposed adjacent to the horizontal plate and arranged to project light outwardly from the parking enforcement device.

8. The parking enforcement device of claim 1, wherein the control board includes a processor, the processor configured to monitor an area designated as NO PARKING for the presence of a vehicle in the area designated as NO PARKING.

9. The parking enforcement device of claim 8, wherein the processor is configured to utilize the camera to perform a machine vision analysis of the area designated as NO PARKING for the presence of vehicles in the area designated as NO PARKING.

10. The parking enforcement device of claim 8, wherein the processor is configured to utilize the camera to capture an image of a license plate of the vehicle in the area designated as NO PARKING.

11. The parking enforcement device of claim 8, wherein the processor is configured to transmit an image of the vehicle in the area designated as NO PARKING to a remote computing system.

12. The parking enforcement device of claim 8, wherein the processor is configured to determine that a parking violation has occurred upon determining that the vehicle is present in the area designated as NO PARKING.

13. The parking enforcement device of claim 8, wherein the processor is configured to initiate a request for towing services upon an expiration of a predetermined period of time following a determination that the vehicle is present in the area designated as NO PARKING without the vehicle having left the area designated as NO PARKING.

14. A method of monitoring an area designated as NO PARKING, the method comprising:
    securing a bollard to a surface adjacent to the area designated as NO PARKING, the bollard including a camera aimed towards the area designated as NO PARKING;
    monitoring the area designated as NO PARKING for the entry of a vehicle into the area designated as NO PARKING;

determining that a parking violation has occurred upon determining that the vehicle has entered the area designated as NO PARKING; and relaying image data of the entry of the vehicle into the area designated as NO PARKING, as captured by the camera, to a remote computing system.

15. The method of claim 14, wherein the step of monitoring the area designated as NO PARKING for the entry of a vehicle into the area designated as NO PARKING includes using the image data from the camera to perform a machine vision analysis to detect the presence of the vehicle in the area designated as NO PARKING.

16. The method of claim 15, wherein the step of monitoring the area designated as NO PARKING for the entry of a vehicle into the area designated as NO PARKING further includes using radar to sense the presence of the vehicle in the area designated as NO PARKING.

17. The method of claim 14, further comprising requesting towing services upon an expiration of a predetermined period of time following the determination that the vehicle is present in the area designated as NO PARKING without the vehicle having left the area designated as NO PARKING.

18. The method of claim 14, wherein the determination that a parking violation has occurred is made without first timing a grace period.

19. The method of claim 14, further comprising:
securing the camera to a center pole extending vertically upwards inside of the bollard; and
locating the camera along the center pole so that the camera views outward from the bollard via a window section of the bollard.

20. The method of claim 14, further comprising illuminating a violation indicator light upon determining that a parking violation has occurred.

* * * * *